(12) United States Patent
Gray

(10) Patent No.: US 6,412,157 B1
(45) Date of Patent: Jul. 2, 2002

(54) DEVICE FOR DISPLACING TUBULAR ELEMENTS RELATIVE TO ONE ANOTHER

(76) Inventor: Keith Arthur Gray, RR#9 Sitel Box 15, Calgary, Alberta (CA), T2J SG5

( * ) Notice: Subject to any disclaimer, the term of this patent is extended or adjusted under 35 U.S.C. 154(b) by 0 days.

(21) Appl. No.: 09/660,905

(22) Filed: Sep. 13, 2000

(51) Int. Cl.[7] .................................................. B23P 19/04
(52) U.S. Cl. ............................ 29/237; 29/272; 29/252; 269/43
(58) Field of Search ............................... 228/49.3, 44.5, 228/47; 29/252, 275, 272, 237, 282, 280; 269/43, 287, 279, 275, 41; 254/29 R, 30

(56) References Cited

U.S. PATENT DOCUMENTS 3,789,493 A * 2/1974 Province ...................... 29/272
3,815,202 A * 6/1974 Squires ......................... 29/272
3,828,413 A * 8/1974 Province et al. ............... 29/272
4,542,892 A * 9/1985 Goldner ........................ 269/41
5,206,980 A * 5/1993 Chapman ..................... 29/237
5,221,099 A * 6/1993 Jansch ......................... 269/275

* cited by examiner

Primary Examiner—Robert C. Watson
(74) Attorney, Agent, or Firm—I. Zborovsky

(57) ABSTRACT

A device for displacing tubular elements relative to one another has two clamping members each movable between an open position in which each of the clamping members is open and can be arranged on a tubular element and a closed position in which each of the clamping members is closed, a fluid-operated unit located between the clamping members and operative for moving the clamping members axially relative to one another, and a power source operative for supplying the fluid operated unit with power fluid so that it can activate the fluid-operated unit and to move the clamping members relative to one another.

6 Claims, 2 Drawing Sheets

DEVICE FOR DISPLACING TUBULAR ELEMENTS RELATIVE TO ONE ANOTHER

BACKGROUND OF THE INVENTION

The present invention relates to a device for displacing tubular elements relative to one another.

In many instances it is necessary to displace tubular elements relative to one another. For example when a water main breaks it is necessary to cut a pipe and to put a new piece which requires two repair collars to hold the new section in place. This is especially difficult in winter when it is very cold, a repairman operates in mud, and there is a very small place on a repair collar to place a bar and to force the pieces together.

Several devices have been developed for displacing the tubular elements, for example the parts of the pipe relative to one another, as disclosed for example in U.S. Pat. Nos. 4,955,757; 4,492,274; 5,570,871; 5,206,980; 5,640,748; 5,647,627. These devices can be however further improved.

SUMMARY OF THE INVENTION

Accordingly, it is an object of present invention to provide a device for displacing tubular elements relative to one another, which is a further improvement of the existing devices.

In keeping with these objects and with others which will become apparent hereinafter, one feature of present invention resides, briefly stated, in a device for pulling tubular elements relative to one another, which has at least two clamping members each movable between an open position in which each of said clamping members is open and can be arranged on a tubular element and each of said clamping members is closed so as to firmly clamp on a tubular element; fluid-operated means located between said clamping members and operative for moving said clamping members axially relative to one another; and a power source operative for supplying said fluid-operated means with power fluid so that it can activate said fluid-operated means and to move said clamping members relative to one another.

When the device is designed in accordance with the present invention, it is very easy and simple to handle, and provides comfortable operation at any conditions for displacing the tubular elements relative to one another. It suffices to apply two clamping members at two axially spaced locations of the tubular elements, and to supply fluid to the fluid-operated means to displace the clamping members relative to one another and therefore to displace the corresponding tubular elements relative to one another automatically under the action of the power fluid.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
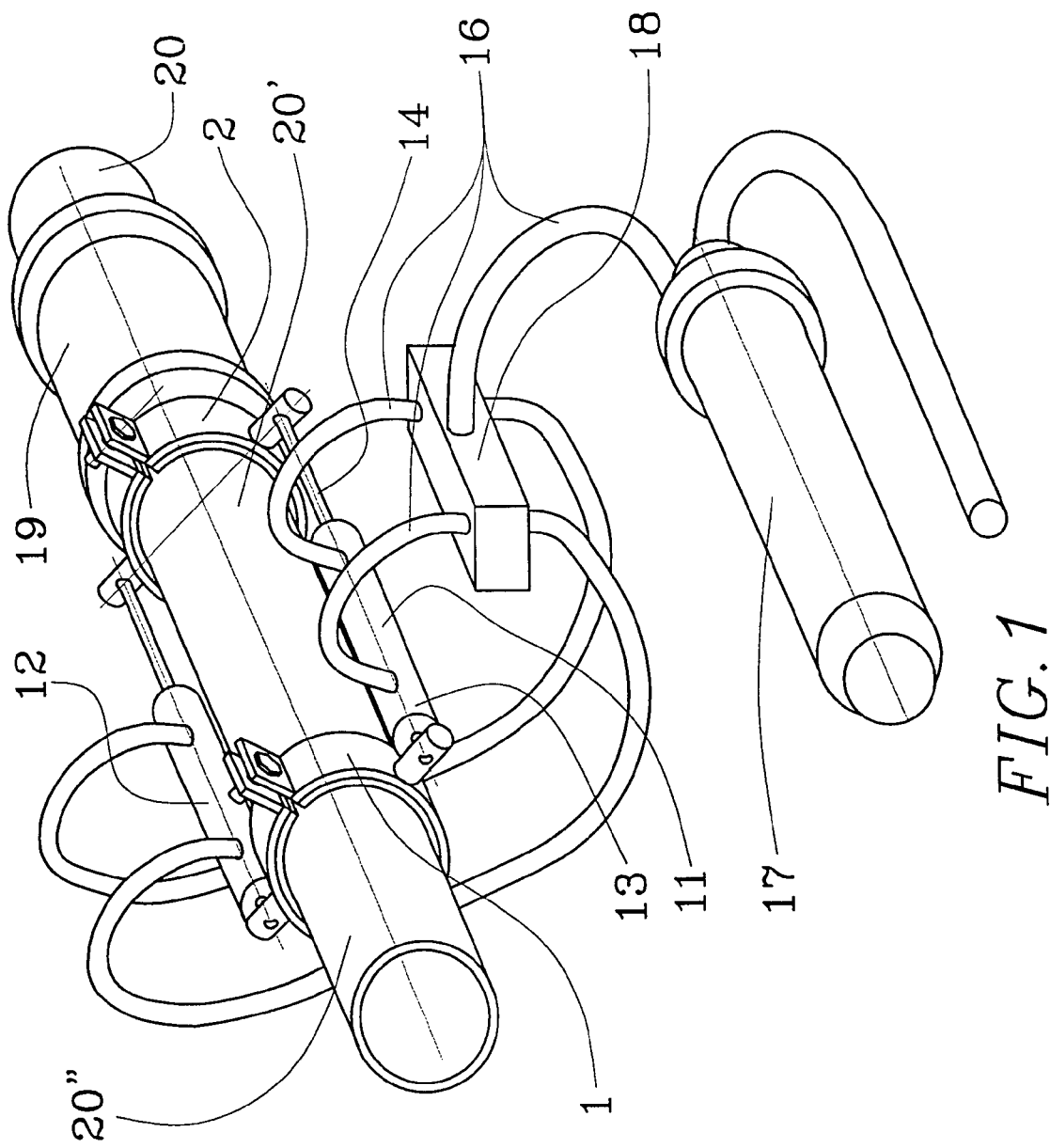
FIG. 1 is a perspective view showing a device for displacing tubular elements relative to one another in accordance with the present invention.
Figure 2:
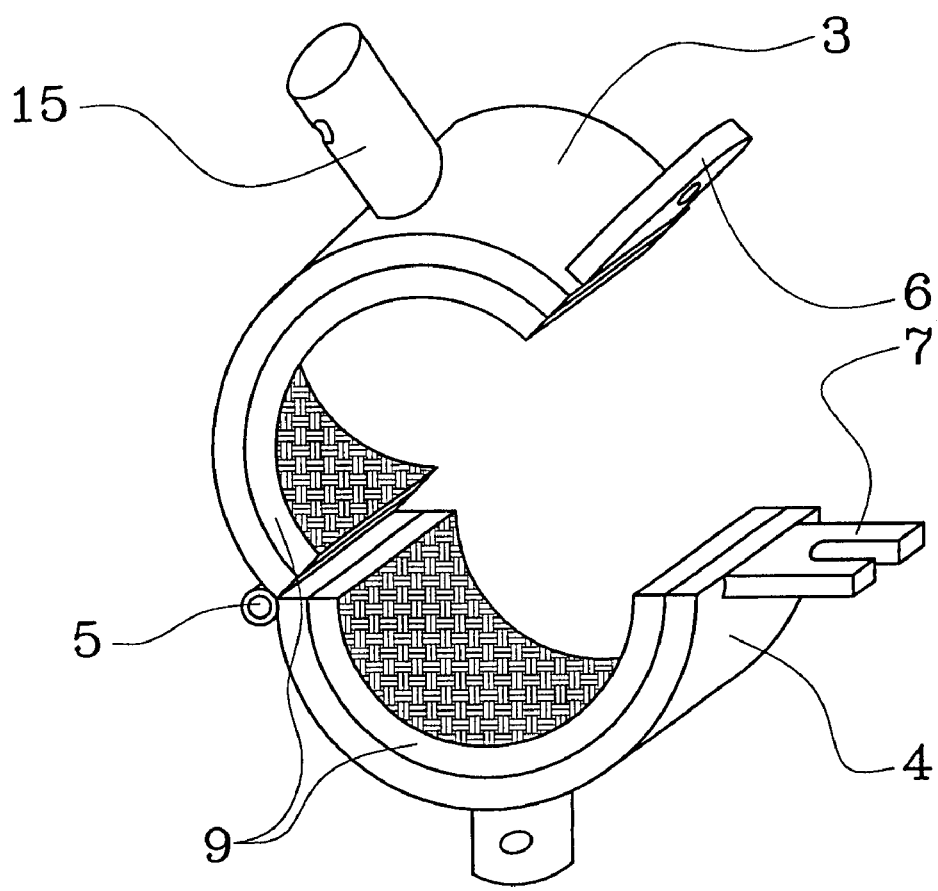
FIG. 2 is a perspective view of one clamping members of the inventive device.

A device for displacing tubular elements relative to one another includes at least two clamps which are identified in reference numerals 1 and 2. Each clamp is composed of two semi-circular segments 3 and 4. At one axial side the segments 3 and 4 are hingedly connected with one another by a hinge 5, so that the segments can be moved between an open position shown in FIG. 2 and a closed position shown in FIG. 1. in the closed position shown in FIG. 1 the segments 3 and 4 are tightened, for example by a not shown bolt which extends through a lug 6 provided with a hole and a projections 7 provided with a slot, which are located on adjoining ends of the segments.

Each clamp 1, 2, can be provided with an insert identified with reference numeral 9. The insert 9 can be composed of an elastic material and/or can have an inner roughening formed for example by a plurality of depressions and projections in its inner surface facing away from the clamps. The insert 9 prevents damage to an outer surface of the tubular elements because of its elasticity on the one hand, and at the same time improves the grip of the clamp of the outer surface because of its roughening on the other hand.

The device further has fluid-operated means operative for displacing the claims 1 and 2 relative to one another. The fluid-operative means in the shown embodiment includes at least two fluid-operated cylinder-piston units 11 and 12 which preferably can be located at two opposite radial sides. Each of the fluid-operated units includes a cylinder 13 connected to one of the clamps and a not shown piston provided with a piston rod 14 connected to the other clamp. The connection can be formed for example by a clamping bolt 15 which extends through a hole in the piston rod 14 and in a projection of the cylinder 13 and is screwed into the segment.

A fluid conduit formed for example as a hose 16 connects each of the fluid-operated cylinder-piston units 11, 12, with a source of the power fluid 17. The power fluid source 17 can be formed for example as a hydraulic/pneumatic hand pump or another outside source. A bi-directional valve 18 is located in the conduits 16. In particular, the conduit 16 has a first branch formed as a single hose extending from the pump 17 to the bi-directional valve 18 and two hoses extending from the bi-directional valve 18 and opening into two chambers of the cylinder, formed at opposite sides of a not shown piston which is movable inside the cylinder.

The device in accordance with the present invention operates in the following manner:

When for example it is necessary to remove a collar 19 from a pipe 20, the clamp 1 is placed on the pipe 20 and tightened on it, and the clamp 2 is placed loosely, without being tightened on the pipe 20, at an axially spaced location so as to abut against the end of the collar 19. Then, the hand pump 17 is operated by a user and supplies the power fluid into a corresponding chamber of the fluid-operated units 11 and 12. As a result, the piston rods 14 are extended and push the clamp 2 to the right, and as a result the collar 19 is also pushed to the right so as to be removed from the pipe 20.

The pipe 20 is composed of two pipe portions 20' and 20". When it is necessary to move the pipe portions 20' and 20" so as to disengage them from one another, the clamp 2 is tightened, similarly to the clamp 1. When the user operates the hand pump 17 and supplies the power fluid into a corresponding chamber of the fluid-operated units 11 and 12, the clamps 1 and 2 which are fixed on the pipe portions 20' and 20" are moved apart so as to provide a space therebetween. Then if necessary an additional piece of pipe is inserted between the pipe portions 20' and 20", and the bi-directional valve 18 is adjusted to such a position that the fluid is supplied to another chamber of each of the fluid-operated units 11, 12 when the user operates the hand pump. The clamps 1 and 2 are displaced toward one another and move the pipe portions 20' and 20" toward one another so as to abut against the additional pipe piece. The additional pipe piece can be welded to the pipe portions 20' and 20".

The same operation can be performed for butt connection of the pipe portions 20' and 20" with one another.

Figure 3:
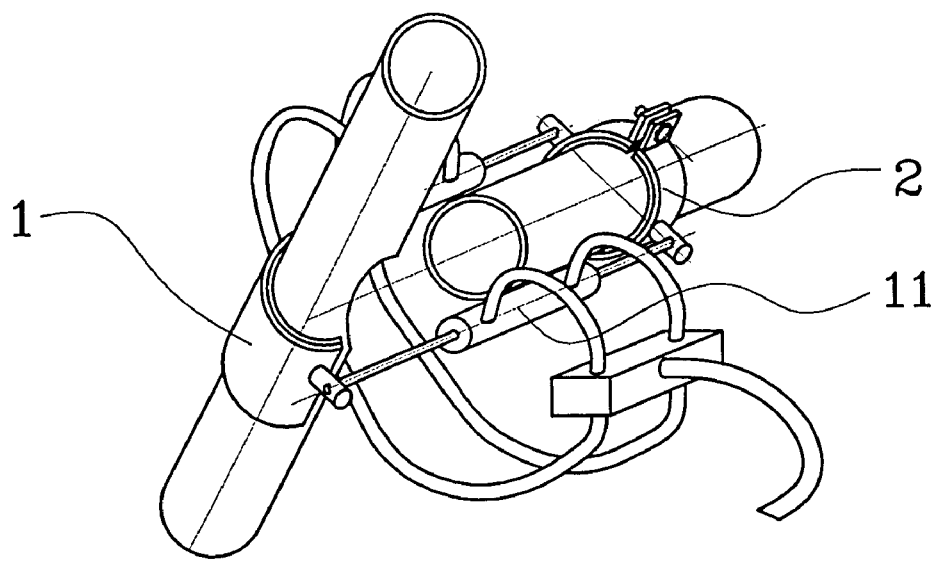
FIG. 3 is a side view of the clamping members in accordance with a further embodiment of the present invention.

FIG. 3 shows another embodiment of the invention. Here the pipe portions are to be welded at 90° to each other. The clamps 1 and 2 are arranged therefore perpendicular to one another. It is possible to use the device for other angles as well.

It will be understood that each of the elements described above, or two or more together, may also find a useful application in other types of constructions differing from the types described above.

While the invention has been illustrated and described as embodied in device for displacing tubular elements relative to one another it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A device for displacing tubular elements relative to one another, comprising two clamping members each composed of two semi-circular segments and also movable between an open position in which each of said clamping members is open and said semi-circular segments are spaced from one another and can be arranged on a tubular element, and a closed position in which each of said camping members is closed and said semi-circular segments are located adjacent to one another to form together a circular clamping member, each of said clamping members having a hinge connecting said semi-circular segments at one radial side to move said semi-circular segments between said open and said closed positions, and means for tightening said segments with one another located at an opposite radial side; and fluid-operated means located between said clamping members and operative for moving said clamping members axially relative to one another, said fluid-operated means including two fluid-operated cylinder-piston units located at opposite radial sides and each having a cylinder directly connected with one of said clamping members between said hinge and said tightening means and a piston with a piston rod directly connected with the others of said clamping members between said hinge an(i said tightening means and movable relative to said cylinder in an axial direction.

2. A device as defined in claim 1; and further comprising means for connecting said fluid-operated means to a power source operative for supplying said fluid-operated means with power fluid alternatingly into two chambers of each of said cylinders at opposite sides of each of said pistons, so as to activate said fluid-operating means and to move said clamping members relative to one another in two opposite directions.

3. A device as defined in claim 1; and further comprising a power source connected with said fluid-operating means and including a fluid-operated hand pump.

4. A device as defined in claim 1; and further comprising an insert provided on each of said clamping members and having a roughening at its side facing away from a respective one of said clamping members.

5. A device as defined in claim 1, wherein said clamping members are arranged coaxially with one another.

6. A device as defined in claim 1, wherein said clamping members are arranged at an angle relative to one another.

* * * * *